United States Patent
Christensen et al.

(10) Patent No.: US 6,319,877 B1
(45) Date of Patent: Nov. 20, 2001

(54) CATALYZED HARDWARE

(75) Inventors: Peter Seier Christensen, Copenhagen NV; Tommy Hansen, Tikøb; Viggo Lucassen Hansen, Brønshøj; Lars Ejby Andersen, Helsingør, all of (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 09/437,338

(22) Filed: Nov. 10, 1999

Related U.S. Application Data

(60) Provisional application No. 60/109,111, filed on Nov. 18, 1998.

(51) Int. Cl.[7] .............. B01J 21/00; B01J 23/00; B01D 53/38
(52) U.S. Cl. .............. 502/527.13; 502/527.12; 502/527.15; 502/527.24; 422/177
(58) Field of Search ............ 502/527.12, 527.13, 502/527.15, 527.24; 422/177

(56) References Cited

U.S. PATENT DOCUMENTS

| | | | |
|---|---|---|---|
| 3,883,307 | * 5/1975 | Kim | 117/227 |
| 4,076,888 | * 2/1978 | Perugini et al. | 428/313 |
| 4,279,782 | * 7/1981 | Chapman et al. | 423/213.5 |
| 4,870,046 | * 9/1989 | Yamanaka et al. | 502/439 |
| 5,407,880 | * 4/1995 | Ikeda et al. | 502/67 |
| 5,980,843 | * 11/1999 | Silversand | 423/210 |
| 6,071,850 | * 6/2000 | Friedman et al. | 502/439 |

OTHER PUBLICATIONS

A. Cybulski and J.A. Moulijn, Structured Catalysts and Reactors, 1998, Chapter 3 (by M. Twigg and D. Webster, entitled "Metal and Coated–Metal Catalysts") pp. 59–89.

* cited by examiner

*Primary Examiner*—Elizabeth D. Wood
(74) *Attorney, Agent, or Firm*—Ostrolenk, Faber, Gerb & Soffen, LLP

(57) ABSTRACT

Method of manufacturing catalyzed hardware including adhering a porous structure on the hardware, applying to and/or within the porous structure a ceramic carrier material and applying catalytic active material to the ceramic carrier material.

7 Claims, 2 Drawing Sheets

CATALYZED HARDWARE

This application claims the benefit of U.S. Provisional Application No. 60/109,111, filed Nov. 18, 1998.

BACKGROUND OF THE INVENTION

1. Field of the Invention

The present invention relates to a method of preparing catalyzed hardware.

2. Description of Related Art

The term catalyzed hardware as used herein relates to catalytic active boiling having the catalyst applied to a metallic surface. Catalysts applied to a metallic surface are advantageous in a number of applications. Coating of catalytic active material on a metal surface is a well known process usually referred to as wash coating and disclosed in the open literature, e.g. Cybulski, A. and Moulijn, J. A., Structured catalysts and reactors, Marcel Dekker, Inc., New York, 1998, Chapter 3, and references herein.

By the known methods, suitable metallic material, preferably a ferritic steel containing Cr and/or Al, is heated to a temperature usually above 800° C. in order to form a surface layer of Cr and/or Al oxide. This layer facilitates proper adhesion of the ceramic material to the steel surface. A thin layer of a slurry containing the ceramic material precursor is applied for on the surface by means of e.g. spraying, painting or dipping. After applying the coat, the slurry is dried and calcined at a temperature usually between 350–700° C. Finally, the ceramic layer is impregnated with the catalytic active material. Alternatively, the catalytic active material is applied for simultaneously with the ceramic precursor.

Certain disadvantages are associated with applying the catalyst to a metal surface by the known methods. Only certain combinations of catalyst and metal can be used since adhesion of the ceramic material to the metallic surface must be obtained. Furthermore, even if adhesion is obtained, the catalyst coating can spall off, since the adhesion strength decreases over due time due to the conditions the catalyst is subjected to. Destruction of the catalytic coating may be caused by thermal stress, dust etc.

SUMMARY OF THE INVENTION

The invention provides an improved method to prepare catalyzed hardware without the above disadvantages by applying a porous supporting material on the metallic surface as a substrate with a higher strength than ceramic material. The supporting material is a metal foam, metal net, expanded metal, sinter metal, metal gauze etc. The supporting material is adhered to the metallic surface by e.g. soldering or diffusion bonding. Subsequently, a ceramic precursor is arranged in the porous structure of the supporting material by means of e.g. spraying, painting or dipping a slurry containing the ceramic precursor. The slurry is then dried and calcined. Finally, the ceramic layer is impregnated with the catalytic active material according to known methods. Alternatively, the catalytic active material is deposited simultaneously with the ceramic precursor.

DETAILED DESCRIPTION OF THE PREFERRED EMBODIMENTS

The invention makes use of a device for applying a supporting structure inside a tube. The device comprises device for use in the manufacture of catalyzed hardware according to claim 1, comprising an induction furnace with a heating zone adapted to heat section of a metallic surface, and a piston arranged within the heating zone to press a supporting structure on the metallic surface.

Figure 1:
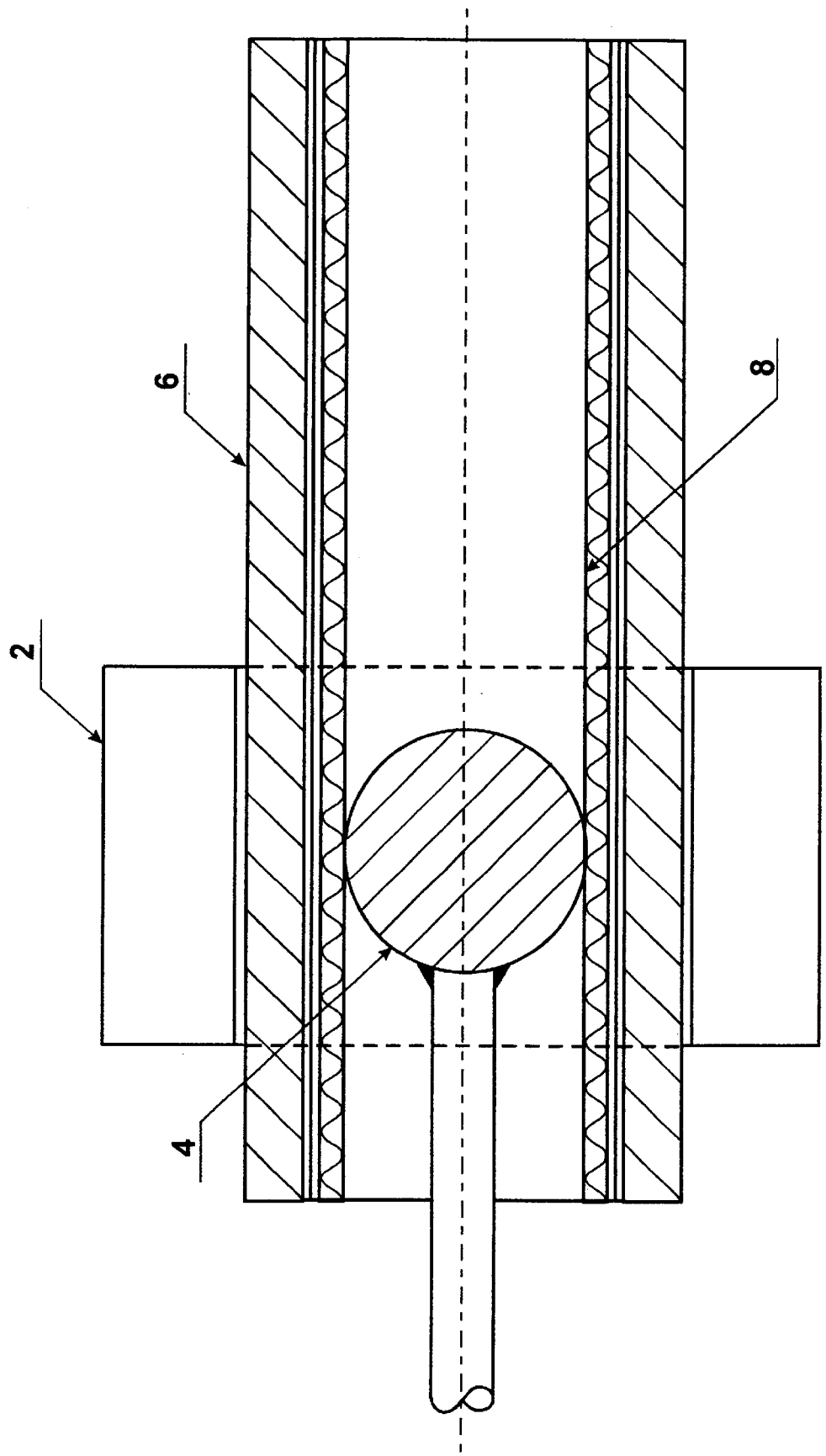
FIG. 1 is a schematic drawing of a first embodiment of the invention.
Figure 2:
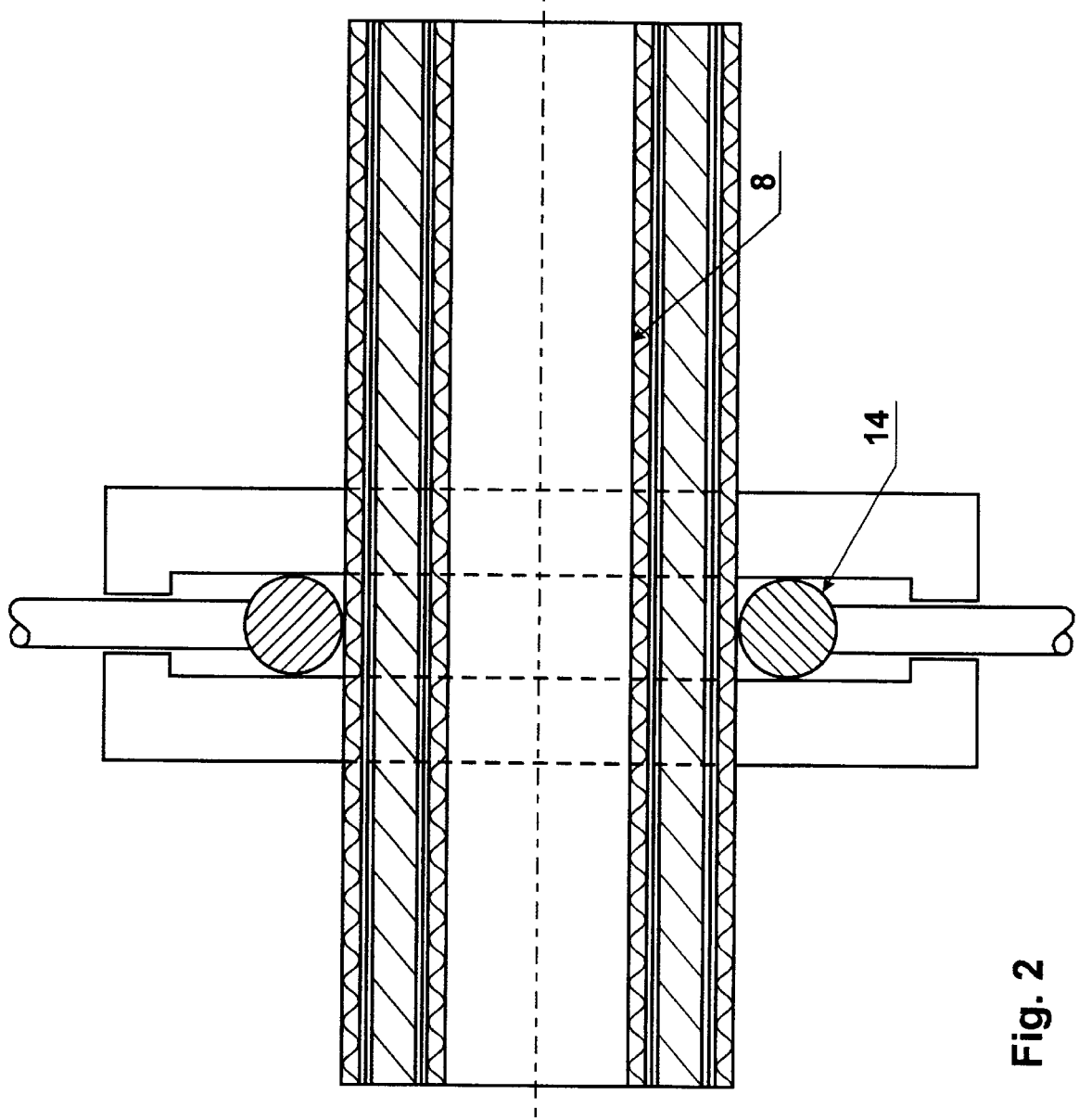
FIG. 2 shows a second embodiment of the invention for use in the application of a supporting structure on an outer wall of a tube.

The supporting structure is, after appropriate pre-treatment of the supporting material and tube, mounted in the tube by means-of solding material. The tube is placed in an induction furnace, so that a section of the tube is heated above the solding temperature. A piston in form of a drift or a sphere is used to press the supporting material against the tube wall in the solding zone in order to ensure contact between the supporting material and the tube wall. A schematical drawing of a specific embodiment of inventive device is shown in FIG. 1. Heating zone 2 and drift 4 are moved along tube length of tube 6 to obtain solding of supporting material 8 along the entire length of the tube. The invention is useful for geometry other than circular tubes by using an appropriately shaped drift. Optionally, the induction furnace can be used for drying and calcining of the catalyst. FIG. 2 shows a further specific embodiment of the invention for use in the application of a supporting structure on outer wall of a tube. As apparent from the FIG. 2, an annular formed drift 14 is employed to press supporting material 8 against outer wall of the tube in similar manner as described above.

Although the present invention has been described in relation to particular embodiments thereof, many other variations and modifications and other uses will become apparent to those skilled in the art. Therefore, the present invention is to be limited not by the specific disclosure herein, but only by the appended claims.

What is claimed is:

1. Method of manufacturing catalyzed hardware having a metallic substrate comprising the steps of:
   adhering a porous metallic material directly on the surface of the metallic substrate;
   applying to and/or within the porous metallic material a ceramic carrier material; and
   applying catalytically active material to the ceramic carrier material.

2. Method of claim 1, wherein the porous metallic material is adhered to the metallic substrate by soldering or diffusion bonding.

3. Method of claim 1, wherein the porous metallic material is adhered to the metallic substrate by mechanical pressure.

4. Method of claim 1, wherein the porous metallic material is adhered to the metallic substrate in a moving heating zone.

5. Method of claim 1, wherein the porous metallic material is adhered to the metallic substrate by arranging the metallic substrate in a moving heating zone and applying mechanical pressure to the porous metallic material in the heating zone.

6. Method of claim 1, wherein the metallic surface is a wall of a tube.

7. Method of claim 1, wherein the porous metallic material is selected from the group consisting of metal foam, metal net, expanded metal, sinter metal and metal gauze.

* * * * *